United States Patent Office 2,800,947
Patented July 30, 1957

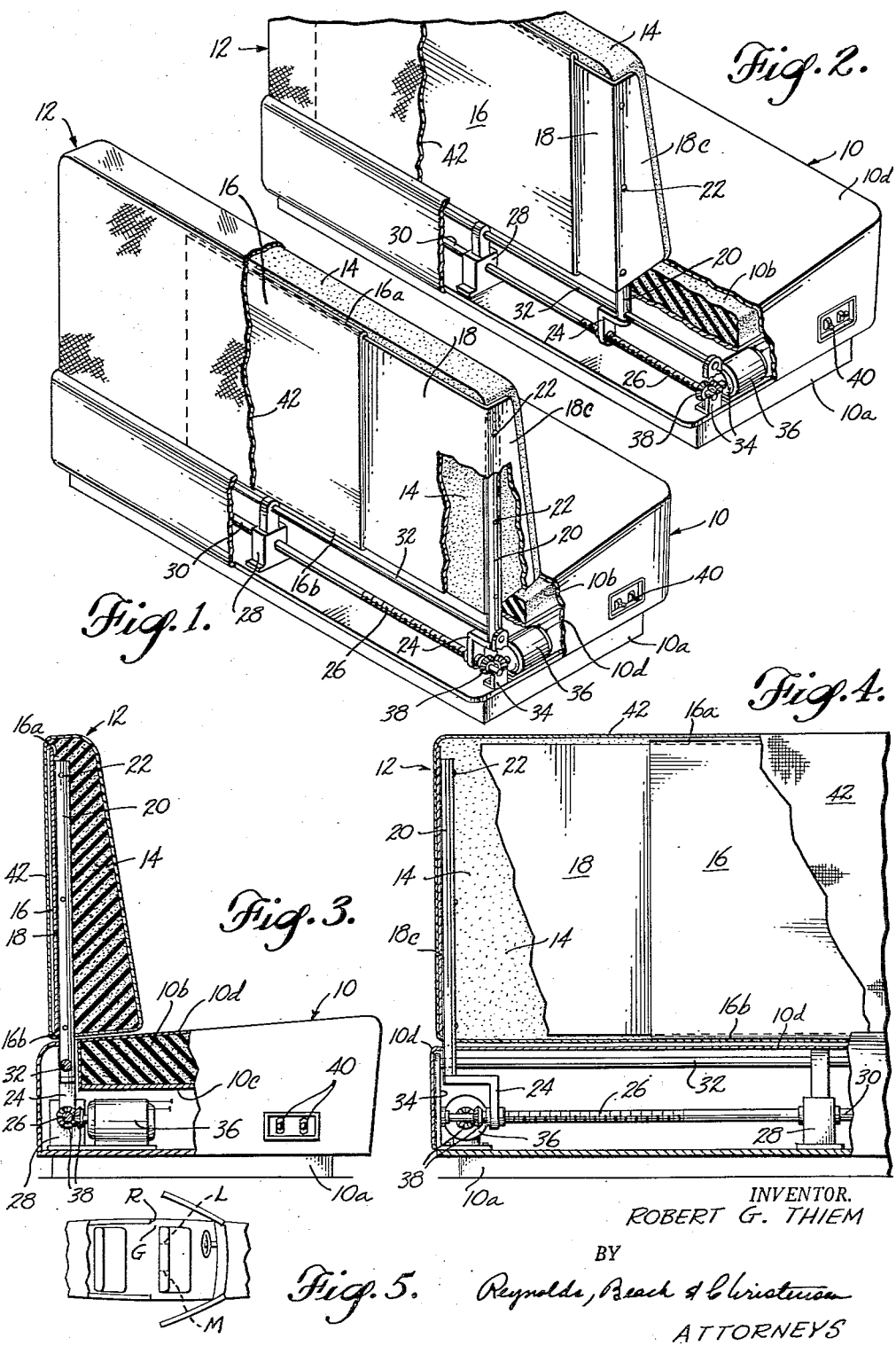

2,800,947

RETRACTABLE-BACK VEHICLE SAFETY SEAT

Robert G. Thiem, Seattle, Wash.

Application September 21, 1956, Serial No. 611,196

10 Claims. (Cl. 155—5)

This invention relates to improvements in vehicle seats and more particularly in retractable-back forward seats for two-door automobiles having passenger compartments behind their forward seats. The invention is herein illustratively described by reference to the presently preferred form thereof; however, it will be recognized that certain modifications and changes therein with respect to details may be made without departing from the essential features involved. This application is a continuation-in-part of my application Serial No. 541,609, filed October 20, 1955, now abandoned.

In the conventional two-door sedan or club coupe automobile the front seat back consists of two independently hinged sections either of which may be swung forwardly and somewhat inwardly on its pivots in order to provide an opening through which passengers may gain access to the rear compartment. Such an arrangement has certain well known shortcomings and limitations. In the event of a collision the back sections of the front seat, or at least one of them is thrown forward and thereby is of little or no protection to persons in the rear seat immediately behind it since their unchecked momentum carries them over the front seat and often into the windshield. Any front seat with a swinging or dropping back therefore provides little or no protection to rear seat passengers in the event of collision. Another disadvantage of this type of seat construction is the inconvenience to passengers occupying the front seat when its back must be swung down in order to permit entry or exit of rear seat passengers. Further, the gap between the separately hinged seat sections is often uncomfortable to front-seat passengers leaning against it. Further, the amount and shape of the opening made at the side of a vehicle by swinging down the back of the front seat does not make it as comfortably negotiable as might be desired.

An object of the present invention is to provide a retractable-back front seat for two-door automobiles and the like which in its normal position furnishes a maximum of protection to rear seat passengers by presenting a barrier which prevents them from being readily thrown over the front seat and into the windshield of the vehicle in the event of collision.

Another object is such a seat construction which permits the passengers occupying the seat to remain comfortably seated while others are entering or leaving the vehicle past the retracted end of the seat in moving into or from the rear compartment.

Still another object is such a seat construction wherein the usual gap between conventional seat back sections is altogether eliminated.

Still another object is an improved retractable-back front seat for such vehicles which forms a more convenient access opening for entrance and exit of rear seat passengers than heretofore.

In attaining these and related objects the invention comprises, in brief terms, the provision of a seat back rigidly mounted against tilting out of its upright position but adapted to be compressed lengthwise of itself by inward movement of one or both of its opposite-end support means transversely of the vehicle, together with means selectively operable for moving said support means independently in order to produce access openings of a shape and size enabling passengers conveniently and comfortably to enter and leave the rear compartment of the vehicle. Preferably the seat back comprises a foam rubber cushion member backed by overlapping stiffener plates guided in relation to each other for relative sliding movement transversely of the vehicle in order to shorten and lengthen the seat back by compression and expansion of the cushion member, such cushion member being connected to upright end support members also connected to the backing plates.

These and other features, objects and advantages of the invention will become more fully evident from the following description thereof by reference to the accompanying drawings.

Figure 1 is a perspective view of the improved seat construction, parts being broken away to illustrate certain details.

Figure 2 comprises a similar view of the seat with one end of the back retracted.

Figure 3 is an end view thereof, partly in section.

Figure 4 is a rear view of an end portion thereof with parts broken away.

Figure 5 is a simplified top view of the arrangement of such a seat in a two-door sedan automobile.

Automobile manufacturers usually allow sufficient space between the rear corner of a front seat and the rear edge of the adjacent door frame to pass the foot and lower leg of a rear seat passenger. In Figure 5 this space or gap is designated G and the rear edge of the door frame R. However, with the low ceiling type of construction now in use the entering or departing rear seat passenger must stoop down to a crouching position as he enters and leaves the vehicle, thus is required to bend his legs at the knee as well as lean over the front seat in so doing. The awkward position which the passenger must assume in entering and leaving the conventional two-door sedan is aggravated by the shape and size of the access opening formed by the downwardly swung front seat back section. With the improved construction herein disclosed, however, much of this inconvenience and discomfort is eliminated inasmuch as the effective width of the access opening, particularly in the lower region thereof, is materially increased. In Figure 5 the left edge of the front seat back may be shifted inwardly approximately to the position L whereas the right edge thereof may be shifted inwardly approximately to the position M assuming the opposite edge remains in its original position. If a sufficiently compressible type of construction is used for the seat back cushion, both edges may be shifted inwardly to their illustrated inner positions simultaneously, although this is unnecessary. Inward shifting of either end by approximately one foot is adequate. If two passengers occupy the front seat at the time either end of the seat back is moved inwardly they may remain comfortably seated simply by one of them sliding over a bit away from the retracted edge.

Referring to the details of the preferred embodiment shown in Figures 1 to 4, inclusive, the seat comprises the bottom 10 consisting of a base 10a adapted for securement to the bed of the vehicle frame and, if desired, for adjustable positioning lengthwise of the vehicle in the conventional manner. The bottom cushion 10b rests on a supporting pan 10c and is covered by upholstery 10d in the usual manner. The illustrated form of the seat bottom is simplified for convenience, and it will be recognized that any suitable type of construction may be employed therein, and that the invention is not dependent on the details thereof.

The seat back 12 extending in upright position along the rear edge of the seat bottom 10 comprises the elongated cushion member 14 of foam rubber or similar compressible material, or constructed in a suitable manner which will permit compression thereof lengthwise of itself. When the cushion member 14 is foam rubber as illustrated, it is relatively flexible hence requires stiffening or backing for support. To this end the cushion member is backed by two plates 16 and 18 disposed in mutually overlapping relationship and guided together for sliding relatively lengthwise in order to vary the amount of their overlap. One of the plates, 16, is provided with reversely bent edges 16a and 16b serving as retaining guides for the plate 18, permitting such relative sliding of the plates while maintaining them in substantially coplanar relationship as an effective integral support for the cushion member 14 in any of the relative positions of the plates. The plate 18 has a forwardly turned outer end portion 18c and the plate 16 has a similar end portion (not shown) which serve as retainers for the respective ends of the cushion member. An upright post 20 is connected by rivets or bolts 22 to the corner formed between the plate 18 and its end portion 18c, and a similar post is likewise connected to the corner of the plate 16. The end portion of the cushion member 14 is suitably secured to the end of the plate 18 and its end portion 18c, and thereby, or separately, to the corner post 20, as by means of adhesive bonding or otherwise, whereas the back side of the cushion over the major portion of the length thereof between the end supports is free to slide on the plates 16 and 18 in order to permit re-expansion and contraction of the cushion for purposes of the invention.

The lower end of the post 20 is rigidly connected to an angle member 24. Such angle member has a threaded bore therein which engages the threaded portion of a screw shaft 26 extending horizontally transversely of the vehicle at a location beneath the seat back. The inner end of the screw shaft 26 is journalled in a fixed support 28 which receives the corresponding end of the similar screw shaft 30 associated with the opposite end portion of the seat. Above the angle member 24 the post 20 is apertured to slide on the guide rod 32. The rod 32 is supported at both ends by brackets 34 mounted on the seat base 10a and in the middle by the support 28. The rod 32 is parallel to and positioned materially above the screw shaft 26 so as to provide support to the seat back against tilting thereof in any direction. The shafts 26 and 30 are independently rotatable. The shaft 26 is rotated by the reversible electric motor 36 and suitable gear reduction means (not separately shown). The motor is mounted on the seat base 10a and is connected to the screw shaft through bevel gears 38. A switch panel 40 mounted on the end of the seat bottom 10 at a convenient location controls energization of the motor 36 through suitable electric circuits in order to rotate the shaft 26 in one direction or the other. Suitable limit switches (not shown) are provided in order to de-energize the motor automatically when the upright support post 20 reaches the desired limits of travel. One such limit is that in which the seat back extends substantially to the corresponding end of the seat bottom whereas the opposite limit corresponds to that in which the seat back cushion member 14 is compressed sufficiently to provide the desired amount of clearance past the end of the seat back for entry and exit of passengers. Other and differently located switch panels equivalent to the panel 40 may be provided in the vehicle at suitable locations. It will be recognized that a similar motor and controls therefor are provided for operating the screw shaft 30 in order to retract and extend the opposite end of the seat back. It will also be recognized that in general other suitable actuating means may be used, manual or power driven, in order to move the seat back ends inwardly to passenger admitting position, and outwardly to normal seating position.

These and other modifications or departures from the illustrated embodiment will be evident to those skilled in the art, as to structural and actuating means employed.

In order to retain the back cushion member 14 in place against the backing plates 16 and 18 to preserve its form or prevent outward bowing or bulging when compressed, the entire seat back is encased by a resiliently contractable cover 42 which provides the desired upholstering effect as well as the functional effect described. This elastic cover 42 is stretched in the extended position of the seat back and contracts resiliently as the seat back is shortened while retaining sufficient further contractability in the shortest condition of the seat back in order to firmly embrace the seat cushion 14 and hold it in place. In a typical application of the invention the seat back will be approximately five and one-half feet long and will be required to shorten approximately one foot in length in order to provide ample clearance at either end for entrance and exit of passengers. Thus the cushion member 14 and the retaining elastic cover 42 need expand and contract only by approximately slightly less than 20% of their total length in order to accomplish the desired result inasmuch as it will be necessary to retract only one end of the seat back at a time. In fact, suitable switching arrangements in the motor energizing circuits may be provided according to well known techniques which preclude energization of one end drive motor when the seat back end support at the opposite end of the seat is in retracted or partially retracted position. Such details are readily obvious to those skilled in the art and need not be described herein.

The seat back cushion member 14 has been illustrated in its preferred form as comprising a solid slab of foam rubber or the like. Other types of construction permitting contraction of the seat back lengthwise of itself while having the desired cushioning effect may also be employed. Furthermore, the back cushion may be formed in sections, one or more of which may be compressible and expandable lengthwise of the seat back in order to permit over-all longitudinal contraction and expansion as desired. Here again, it will be evident that the details of seats incorporating the invention may vary.

I claim as my invention:

1. A retractable-back vehicle seat comprising, in combination with a seat bottom of predetermined length, a seat back extending along the rear edge thereof, said seat back comprising a cushion member normally extending substantially the full length of said seat back and adapted to be compressed to a materially lesser length, support means connected to respectively opposite ends of said cushion member and maintaining the same upright, and means guiding at least one of said support means to permit translational movement thereof in the direction toward and from the opposite support means, thereby to shorten and lengthen said cushion member.

2. A retractable-back vehicle seat comprising, in combination with a seat bottom of predetermined length, a seat back extending along the rear edge thereof and having a normal length corresponding to that of the seat bottom, said seat back comprising a cushion member normally extending substantially the full length of said seat back and adapted to be compressed to a materially lesser length, upright support means connected to respectively opposite ends of said cushion member and maintaining the same upright, and means guiding at least one of said support means to permit translational movement thereof in the direction toward and from the opposite support means, thereby to shorten and lengthen said cushion member.

3. The vehicle seat defined in claim 2, wherein the cushion member is so flexible as to require rigid backing along substantially the full length thereof, and the seat back further includes rigid backing plates secured to the respective upright support means and extending therefrom in substantially coplanar relationship across the rear face of the seat back, said backing plates being guided together to permit coplanar movement of one thereof toward and from the other accompanying movement of one such support means toward and from the other, thereby to permit shortening and lengthening of the cushion member and its backing together.

4. The vehicle seat defined in claim 3, wherein the cushion member comprises foam-rubber-like material, and means interconnecting the backing plates to slide together in overlapping relationship.

5. The vehicle seat defined in claim 3, and resiliently contractable seat cover means extending around and over said seat back, said cover means being stretched and lengthened against its resilient recoil force in the lengthened condition of the seat back.

6. The vehicle seat defined in claim 5, and reversible power operated means connected to the movable support means and selectively energizable to move such means toward and from the other support means for shortening and lengthening the seat back.

7. The vehicle seat defined in claim 2, and reversible power operated means connected to the movable support means and selectively energizable to move such means toward and from the other support means for shortening and lengthening the seat back.

8. A retractable-back vehicle seat comprising, in combination with a seat bottom of predetermined length, a seat back extending along the rear edge thereof, said seat back comprising a cushion member normally extending substantially the full length of said seat back and having at least a portion of its length adapted to be compressed to reduce said cushion member to a materially lesser length, upright support means connected to respectively opposite ends of said cushion member and maintaining the same upright, means guiding at least one of said support means to permit translational movement thereof in the direction toward and from the opposite support means, thereby to shorten and lengthen said cushion member, and power operated means connected to said movable support means and selectively energizable to effect such movement in either direction.

9. In an automobile of the two-door type, the combination comprising a seat bottom spanning substantially the full width of the automobile between the two doors thereof, a seat back extending in upright position along the rear edge of said seat bottom, said seat back having a normal length substantially equal to that of said seat bottom transversely of the automobile and being compressible lengthwise of itself to a materially reduced length, said seat back comprising support means at each end supporting the same against tilting, means guiding said support means to permit independent translational movement thereof transversely to the automobile without tilting thereof lengthwise of the automobile, thereby to shorten and lengthen said seat back from either end thereof, and actuating means respectively connected to said support means and selectively operable to effect such movement of said support means individually in either direction.

10. In an automobile of the two-door type, the combination comprising a seat bottom spanning substantially the full width of the automobile between the two doors thereof, a seat back extending in upright position along the rear edge of said seat bottom, said seat back having a normal length substantially equal to that of said seat bottom transversely of the automobile and being compressible lengthwise of itself to a materially reduced length, said seat back comprising support means at each end supporting the same against tilting, means guiding at least one of said support means to permit movement thereof generally transversely to the automobile without tilting thereof lengthwise of the automobile, thereby to shorten and lengthen said seat back, and actuating means connected to said movable support means and selectively operable to effect such movement thereof in either direction.

References Cited in the file of this patent
UNITED STATES PATENTS

| | | |
|---|---|---|
| 843,780 | Wheatley | Feb. 12, 1907 |
| 954,594 | Shaw | Apr. 12, 1910 |
| 1,262,751 | Choma | Apr. 16, 1918 |